United States Patent [19]

Dyballa et al.

[11] 4,109,517

[45] Aug. 29, 1978

[54] METHOD AND APPARATUS FOR CONTROLLING THE CORRECT ANGULAR ADJUSTMENT OF PERIODIC INJECTION OPERATIONS

[75] Inventors: Manfred Dyballa, Aichwald; Dieter Schützenauer, Schorndorf, both of Fed. Rep. of Germany

[73] Assignee: Daimler-Benz Aktiengesellschaft, Fed. Rep. of Germany

[21] Appl. No.: 716,204

[22] Filed: Aug. 20, 1976

[30] Foreign Application Priority Data

Aug. 21, 1975 [DE] Fed. Rep. of Germany ....... 2537219

[51] Int. Cl.$^2$ .............................. G01M 15/00

[52] U.S. Cl. .............................. 73/119 A

[58] Field of Search .............................. 73/119 A, 117.3

[56] References Cited

U.S. PATENT DOCUMENTS

| | | | |
|---|---|---|---|
| 3,289,077 | 11/1966 | Miller | 73/71.4 X |
| 3,527,087 | 9/1970 | Converse et al. | 73/117.3 |
| 3,815,411 | 6/1974 | Emerson | 73/117.3 |

*Primary Examiner*—Jerry W. Myracle

*Attorney, Agent, or Firm*—Craig & Antonelli

[57] ABSTRACT

A method and apparatus for measuring or controlling the correct phase adjustment of periodic injection operations in cyclically operating internal combustion engines relative to a predetermined movement phase of the drive unit parts of the internal combustion engine, in which the closing of an injection valve of a working space is acoustically detected while the internal combustion engine rotates; the time interval of the beginning of the noise initiating the closing of the injection valve with respect to the predetermined movement phase of the drive unit parts belonging to the same working space is also determined whereby the thus determined time interval then serves at least indirectly as control value.

60 Claims, 5 Drawing Figures

METHOD AND APPARATUS FOR CONTROLLING THE CORRECT ANGULAR ADJUSTMENT OF PERIODIC INJECTION OPERATIONS

The present invention relates to a method for measuring or controlling the correct angular adjustment of periodic injection operations in cyclically operating internal combustion engines relative to a predetermined movement phase of the drive unit parts of the combustion engine.

In known methods of this type, the position of the feed commencement for the injection was determined within an operating cycle and examined whether this feed beginning lies ahead of the upper dead-center position by the correct angular amount, for example, by 24°. One possibility resides in opening the injection system of one cylinder and to rotate the engine by hand. The feed beginning will become noticeable at the open line-end. The position of the flywheel which can be read off in this condition indicates the position of the feed beginning. Naturally, this so-called overflow method entails relatively large inaccuracies because in principle it is based on very inaccurate criteria. Furthermore, this is a quasi-static method which leaves without consideration dynamic influences that cannot be neglected by any means. In addition to the large inaccuracies, this method additionally entails the disadvantage that it can be carried out only with an opened injection system. An opening of the injection system, however, is very disadvantageous by reason of the danger of dirt admission into the injection system which is very critical in this respect, and additionally is very complicated and time-consuming by reason of the required careful venting of the system during closing thereof.

Another prior art possibility to test the adjustment of the phase position of the injection operations resides in installing a pressure transducer into the line system and to evaluate the electrical output signal of the pressure transducer. This method represents a progress compared to the overflow method insofar as a control is possible with a running engine and dynamic influences on the phase position of the injection operations can be detected therewith. However, it is also disadvantageous with this prior art method that the injection system has to be opened for installing the pressure transducer. This disadvantage might be circumvented in that in each internal combustion engine a pressure transducer is built into the injection system beforehand. This, however, would be a cost expenditure which could hardly be accepted. As to the rest, the pressure transducer would be limited in its length of life by the constant loading with injection pressure shocks and would thus probably become useless for tests and controls during a later phase of life of the engine. Apart therefrom, however, it is additionally disadvantageous that the beginning of the pressure rise does not provide without any further measures an indication or marking which can be used for an exact measurement or control; instead, the pressure rise starts gradually, i.e., starts distributed over approximately 1° of crankshaft angle. Consequently, notwithstanding the great expenditures, a relatively large measuring error is still connected with the described prior art method.

By reason of the described circumstances during the measurement and during the subsequent venting of the injection system and by reason of its soiling danger, one has dispensed with the series manufacture of Diesel engines to measure or test the correct phase position of the injection instant. Instead, one relies on the phase-correct assembly of the crankshaft and of the pump shaft of the injection pump. However, numerous and multiple error sources still exist in that connection, notwithstanding measures and precautions from a constructive and assembly point of view, which aim at a correct assembly, so that an optimum adjustment of the injection system cannot be assured therewith, above all cannot be assured in every case.

Above all, the exhaust gas regulations which have become more strict in recent times, again cause a greater interest in an optimum injection adjustment and a better control of the series assembly because an injection system which is not optimally adjusted as regards phase, is under certain operating conditions of the engine more likely and more frequently the cause for the soot formation in the exhaust gases of the engine. Additionally, power output loses are connected with a poorly adjusted injection system.

It is the aim of the present invention to provide a method for measuring the correct adjustment as regards phase of injection systems, which dispenses with an opening of the injection system and supplies the accurate values for the actual phase position of the injection operations relative to the working cycle of the internal combustion engine.

As solution to the underlying problem, it is proposed according to the present invention to so proceed that the closing of an injection valve of a working space is acoustically detected with a rotating internal combustion engine and the time interval of the beginning of the noise initiated by the closing is also determined in relation to the predetermined movement phase of the drive unit parts belonging to the working space, whereby this time interval serves at least indirectly as control value.

Whereas heretofore reference was always made in the adjustment of the injection system to the correct phase position of the feed beginning, the present invention utilizes a different approach: it orients itself by reference to the injection end. This reversal is predicated on the recognition that the injection operations with a given engine rotational speed proceed, independently of their phase position and conditioned on construction, within always identical time intervals or—in relation to the crankshaft position—within always constant angular spaces and that, accordingly, also the injection end may be a suitable point of time, by reference to which the phase position of the injection operation can be adjusted. The injection end is indicated by an acoustically very distinct, striking signal by reason of the sudden descent of the valve needle onto its seat, whose start can be localized over considerably smaller ranges of the crankshaft angle than known heretofore. This signal can be detected or picked up externally at the injection valve by means of a clamped-on body sound pick-up element without opening the injection system.

The method of the present invention may be appropriately carried out in detail, on the one hand, by the following measures:

(a) at the drive units parts of a working space of the internal combustion engine or at a rotating part immovably fixedly connected with the drive unit parts, a marking which can be electrically detected or picked up at least indirectly, is mounted at such a circumferential location that the marking represents the respective movement phases of the displacement element of the corresponding working space;

(b) at the circumferential place corresponding to the predetermined movement phase of the drive unit parts, a pick-up device, which detects the passage of the marking and produces an electrical signal during the passage thereof, is mounted at circumferentially fixed parts of the internal combustion engine;

(c) a body sound pick-up member is acoustically conductively connected at the housing body of the injection valve itself belonging to the working space or at a part acoustically conductively connected therewith;

(d) the electrical signals of the pick-up device and of the body sound pick-up member are fed at least indirectly into an electronic apparatus, operable to determine and evaluate short time intervals, and the time interval between the two signals is then determined therein.

This method, if it is to be used with an installed engine, presupposes certain constructive measures, for example, a projecting pin in the flywheel disk of the engine and a mounting support in the flywheel housing for the pick-up device which should be installed beforehand in the engine.

In engines which do not possess these facilities, the method of the present invention can be carried out is a somewhat modified form in the following manner:

(a) at a rotating part immovably fixedly connected with the drive unit parts, a circumferential scale or marking with a defined and known circumferential position is provided while on the stationary housing or the like a pointer or arrow pointing onto the scale or marking is provided at an adjacent place;

(b) the circumferential scale or marking of the internal combustion engine is stroboscopically illuminated with such a flashing frequency and phase position of the flashes that the pointer appears to lie in coincidence with a scale line representing the predetermined movement phase of the drive unit parts belonging to a working space or with the marking;

(c) a body sound pick-up member is acoustically conductively connected to the housing body of the injection valve itself which belongs to the working space or at a part acoustically conductively connected therewith;

(d) the electrical signals of the sound pick-up member and the pulse sequence of the stroboscope are at least indirectly fed into an electronic apparatus operable to determine and evaluate short time intervals and the time interval thereof is then determined therein.

Appropriately, the stroboscope is thereby indirectly controlled by the signals of the body sound pick-up member and is continuously synchronized in this manner with the engine rotational speed.

The rotational speed per minute of the internal combustion engine can be determined and possibly be indicated by means of the electronic evaluating apparatus on the basis of the time sequence of the pick-up signals or of the stroboscope pulses. A measurement result of the adjustment of the phase position of the injection operations which is independent of time or rotational speed, is obtained if the determined time interval of the two signals is multiplied with the determined rotational speed or with a proportional magnitude and this product is indicated as value proportional to the angle.

The first applications and tests of the method according to the present invention have indicated still further application possibilities. For that purpose it is appropriate to carry out the measurements over many working cycles of the internal combustion engine and to thereby record especially the output signal of the body sound pick-up member in its development with respect to time. An evaluation of the closing noise is possible especially with signals stored on paper—as inscription—or on sound tapes. Of course, the injection behavior at the customary engine rotational speed is especially of interest, whence the method is carried out above all at rotational speeds lying above the idling rotational speed of the engine; the engine thereby runs preferably under its own force. In addition thereto, it is also advantageous for certain controls if the internal combustion engine is accelerated from standstill preferably by an associated electrical driving motor. At very slow rotational speeds, as occurs at the beginning of the acceleration of the drive unit parts of the engine from standstill, a chattering normally occurs with injection valves operating completely satisfactorily which is not noticeable or registrable with jamming or otherwise defective valves. Such a chatter or—if it is missing—a freezing or jamming of the valves can be seen from the oscillogram of the closing noise in the starting phase.

The evaluation of the body sound signals opens up still further possibilities. More particularly, a periodic drifting of the starting of the closing noise about a normal position with respect to time can be analyzed from the body sound signal. From the periodicity of this drift and from the relationship of the number of cycles per minute with respect to the rotational speed of participating mechanical drive members in the drive connection between the crankshaft and the injection pump, certain conclusions can be drawn with respect to certain indexing or dividing errors within this drive connection which occur, for example, as a result of errors or slight inaccuracies in the pitch of gears, etc. This possibility can be ascribed to the fact of the very hard beginning of the closing noise and of the exact detection of the injection end conditioned thereon.

With reciprocating piston engines having a unitary cylinder head, the injection valves of the different working spaces which are screwed-in at the cylinder head, are connected with one another relatively sound-hard, i.e., non-absorbing. For that reason, the closing noise of the injection valves of the adjacent cylinders can also be registered at the one body sound pick-up member. These auxiliary signals can be evaluated meaningfully in different ways. For example, one can control whether these signals are present or not and can draw conclusions therefrom with respect to an at least approximately satisfactory operation of the other injection valves. This can take place, for example, in that in each case the number of the weaker closing noises registered between two strong closing noises is counted. If an auxiliary signal is missing, then this means that the valve needle or pin of the corresponding valve is completely jammed or stuck in the raised position. Furthermore, also the time interval of the auxiliary signals can be determined and, inter alia, conclusions can be drawn therefrom also with respect to the manner of operation of the pump. If the time intervals are all equal among one another, then it can be assumed that also the plungers of the injection pump have among each other mechanically the same installed condition and/or wear condition. If an auxiliary signal falls outside the normal sequence, then the pump is not completely satisfactory. In such a case, a body sound pick-up member will also be appropriately clamped directly to the injection valve which operates irregularly with respect to time and one will attempt at first to find out acoustically the causes therefor.

Accordingly, it is an object of the present invention to provide a method and apparatus for controlling the correct angular adjustment of periodic injection operations, especially of internal combustion engines, which avoids by simple means the aforementioned shortcomings and drawbacks encountered in the prior art.

Another object of the present invention resides in a method and apparatus for controlling the correct angular adjustment of periodic injection operations which assure great accuracy and permit testing under dynamic conditions.

A further object of the present invention resides in a method and apparatus for controlling the correct angular position of periodic injection operations which eliminates the danger of entry of dirt into the injection system while at the same time dispensing with the need of opening and subsequently venting the injection system.

A still further object of the present invention resides in a method and apparatus of the type described above which is highly accurate and reliable in operation, yet involves relatively low costs and can be used in series manufacture with any Diesel engine.

Another object of the present invention resides in a method for controlling the correct angular adjustment of periodic injection operations in Diesel engines which assures an optimum operation of the engine, thereby eliminating power losses and minimizing soot in the exhaust gases.

Still another object of the present invention resides in a method and apparatus of the type described above which offers great versatility in its use and application.

These and other objects, features and advantages of the present invention will become more apparent from the following description when taken in connection with the accompanying drawing which shows, for purposes of illustration only, two embodiments in accordance with the present invention, and wherein:

FIG. 3 is an elevational view of clamping pliers for clamping the body sound pick-up member onto the injection valve housing or the like;

Figure 3:
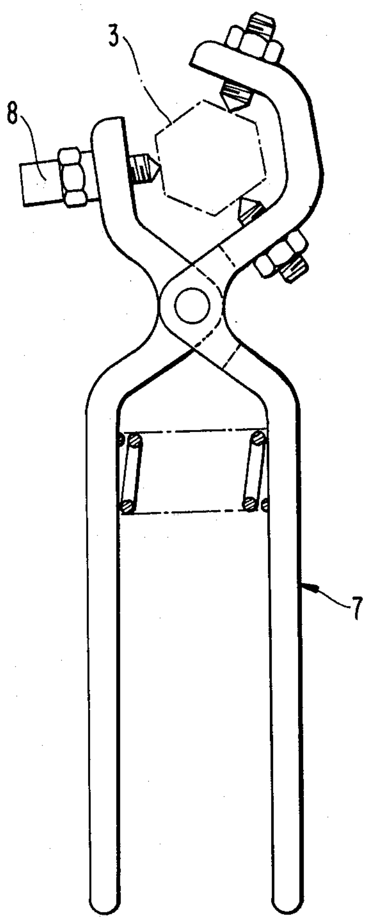

Referring now to the drawing wherein like reference numerals are used throughout the various views to designate like parts, the measuring installations illustrated in the two block diagrams are similar in many respects. Both include a four-cylinder Diesel engine 1 with an injection pump 2, injection valves 3, flywheel 4, crankshaft 5 and reciprocating pistons 6. A piston 6 disposed in the upper dead-center position is illustrated in dash lines. A body sound pick-up member 8 (FIG. 3) is acoustically conductively clamped to the associated injection valve by means of a pair of clamping pliers 7 separately shown in FIG. 3.

In the electronic measuring apparatus indicated in block diagram, at first a so-called charge amplifier 9, a low-pass filter 10, a matching amplifier 11 and a monostable flip-flop 12 or multivibrator are provided for the further processing of the body sound signals. The output thereof is connected with an electronic evaluating unit of conventional construction generally designated by reference numeral 13 and to be explained more fully hereinafter which utilizes conventional logic elements and circuits to achieve the described purposes.

In the charge amplifier 9, the change in charge of the active part in the body sound pick-up member 8—for example, a quartz crystal—which occurs with a sound interaction, is amplified and converted into a correspondingly large voltage change. The low frequency background noises are filtered out of this signal by means of the low-pass filter 10. After a corresponding further amplification in the matching amplifier 11, the multivibrator stage 12 is then controlled by means of the thus amplified, filtered signal, which with the beginning of the body sound signal produces a rectangular pulse of adjustable duration. Care is taken by measures realized with conventional circuitry that the rise of the rectangular pulse takes place as steeply as possible. The beginning of the body sound signal is thus converted into the rising flank of a rectangular pulse (pulse $i_1$). An electronic unit 14 of conventional construction which is operable to defect time intervals of short duration is additionally provided in the measuring system and includes conventional logic elements and circuits to calculate from a time pulse sequence, a rotational speed—rotational speed measuring apparatus 14—and another electronic unit 15 also of conventional construction which further transmits at regular intervals the determined rotational speed to the evaluating unit 13 and which feeds the further transmitted value constant into the evaluating unit—rotational speed interrogating or read-out unit 15. As an example, the rotational speed measuring device of conventional construction will compute a rotational speed from the spacing with respect to time of the pulse sequence, and more particularly the rotational speed is computed after each pulse or—depending on the construction of the apparatus—for instance, after each tenth pulse. Each pulse thus produces a new rotational speed result. The thus obtained rotational speed results are approximately equally large during a continuing test under constant test conditions; nevertheless, one must count always with rotational speed fluctuations within the range of at least one per thousand. The respectively existing rotational speed result is then picked-out in the electronic unit 15 of conventional construction over considerably longer cycle intervals than corresponds to the pulse sequence, for example, the existing rotational speed is picked-out only every 20 seconds and is then retained over the selected cycle interval as a constant value. The input $n$ in the evaluating unit 13 supplies to the same the rotational speed signal of the signal 1 which may be digitally displayed in the upper number row ($n$) by the use of conventional techniques.

The evaluating unit 13 is an electronic unit of conventional construction which is operable by conventional means to detect the time difference between two pulses which are supplied thereto at the inputs $i_1$ and $i_2$. Therebeyond, this unit 13 is also able to multiply this time-difference signal with the rotational speed signal and with a calculating factor. As a result thereof, the time difference can be determined as arc-measurement, i.e., angle measurement, independently of the rotational speed. This value can be digitally displayed in the lower number row $\alpha$, again by the use of conventional techniques.

Figure 1:
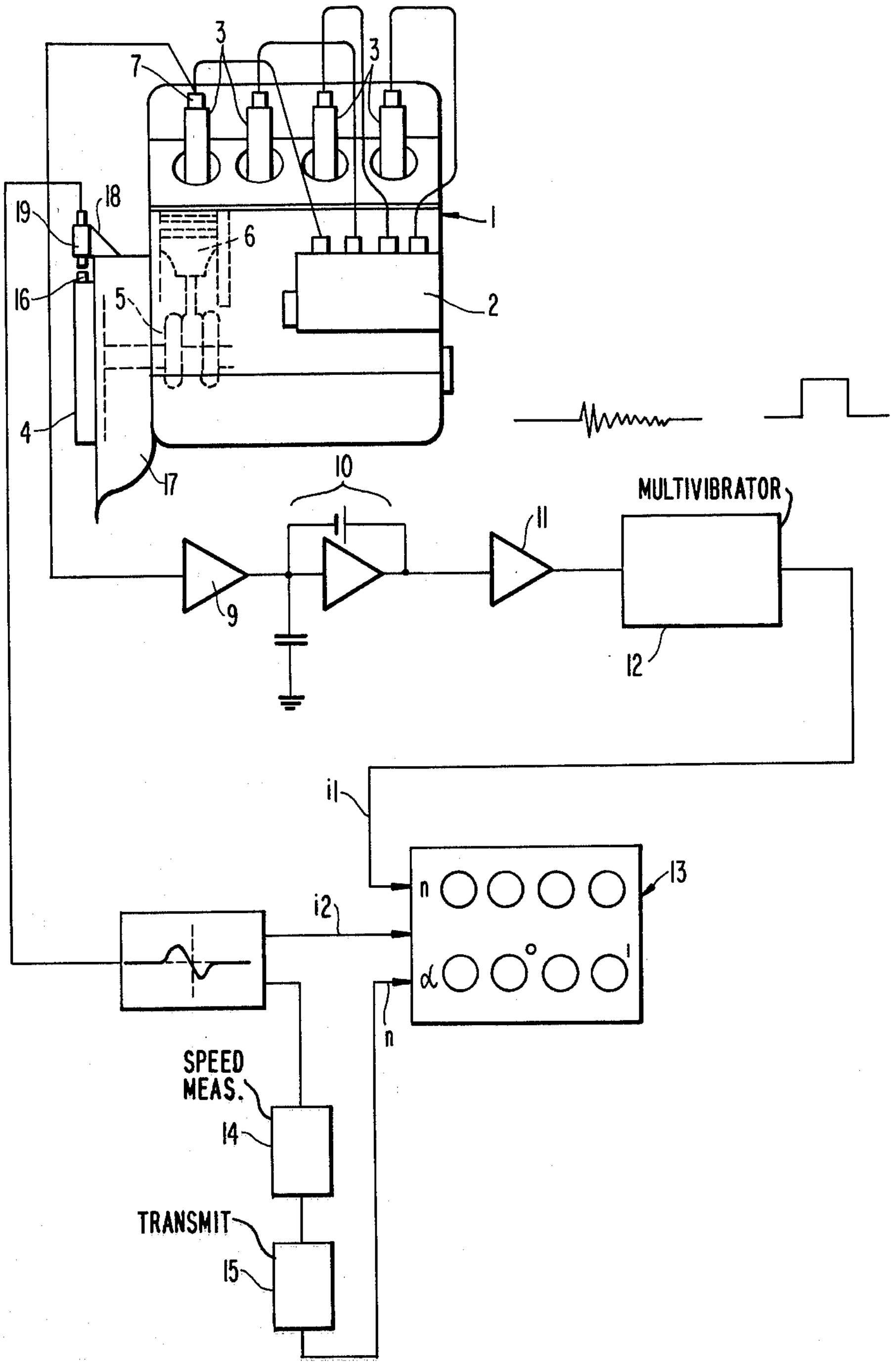
FIG. 1 is a schematic block diagram of one embodiment of the measuring installation for carrying out the method of the present invention, and more particularly with the aid of a so-called top dead-center transducer or signal generator at the flywheel of the engine.

In the measuring installation according to FIG. 1, a measurement pin 16 of ferromagnetic material is embedded in the flywheel disk 4 of the engine at the place corresponding to the crankshaft throw of the most forward (first) cylinder. The mounting bracket 18 for the mounting of an inductive pick-up member 19 in a predetermined, defined position is provided at the flange of the flywheel housing 17. More particularly, the bracket 18 is arranged at a circumferential place such that the pick-up member 19—in the position of the first (most forward) piston 6 in the upper dead-center position—accurately coincides with the measuring pin 16. When the measurement pin 16 sweeps past the pick-up member 19, a voltage is induced in the pick-up 19 having a sinusoidal-like curve. The passage through zero of the sinusoidal voltage marks the passage of the first piston 6 through the upper dead-center position which is represented by pulse $i_2$, generated at the instant of zero voltage by conventional means. As already described, the time difference of the two pulses $i_1$ and $i_2$ is measured and—in relation to the respective rotational speed—is indicated by the evaluating unit 13 as a magnitude proportional to the angle.

The measurement system according to FIG. 1 or the measurement system according to FIG. 2 to be explained more fully hereinafter is very well suited for repair shops and series production because the illustrated building blocks can be readily accommodated in a unitary, well-encapsulated apparatus and only two connections—one for the upper dead-center signal and one for the body sound signal—have to be extended to the engine, and as to the rest, a digital indication or display of the values can be realized. Sensitive measuring instruments are not required.

Figure 4:
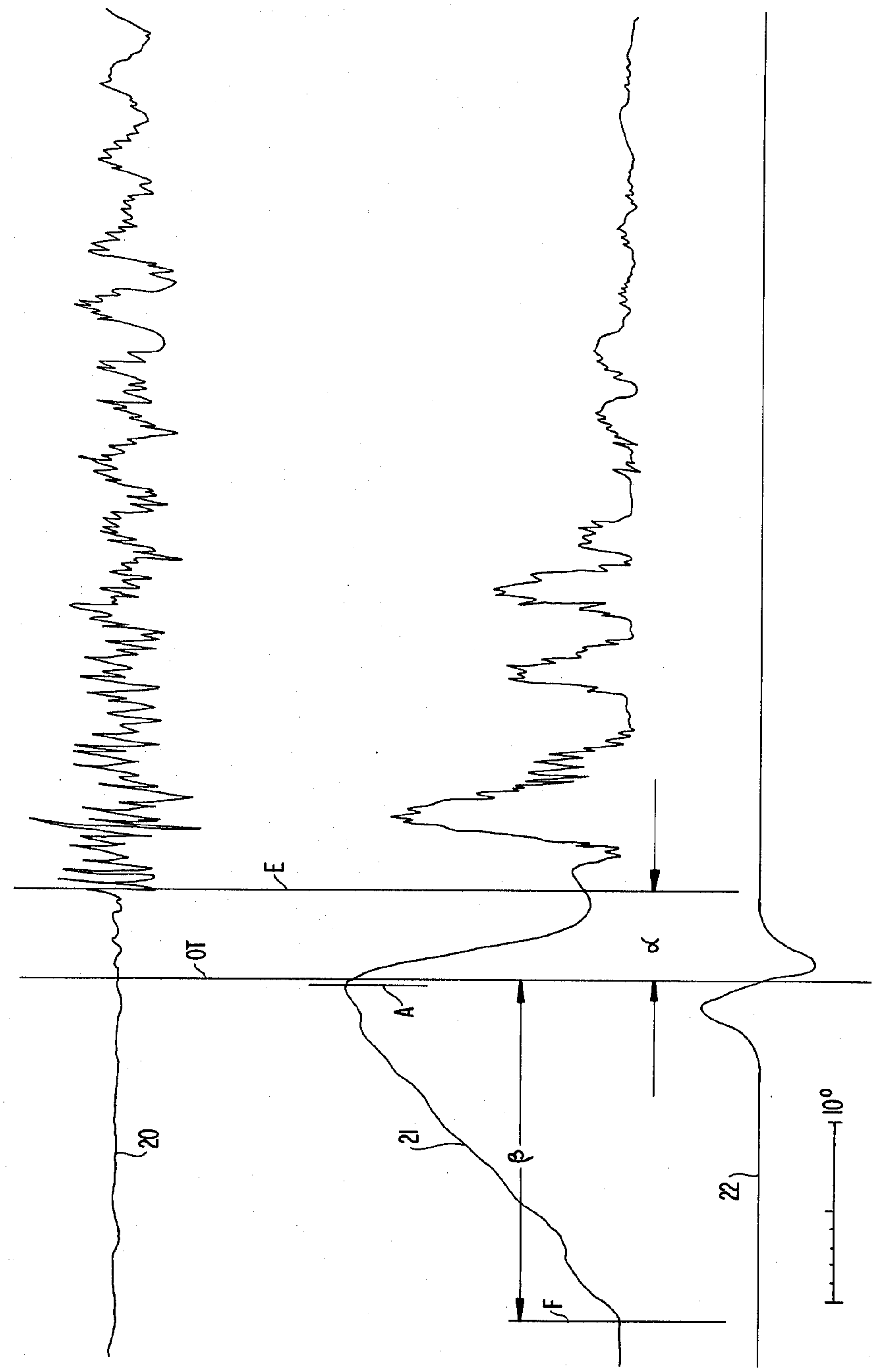
FIG. 4 is an oscillographic recording of the injection pressure and of the body sound signal as well as of the dead-center position signal with an approximately correct phase adjustment of the injection operation.
Figure 5:
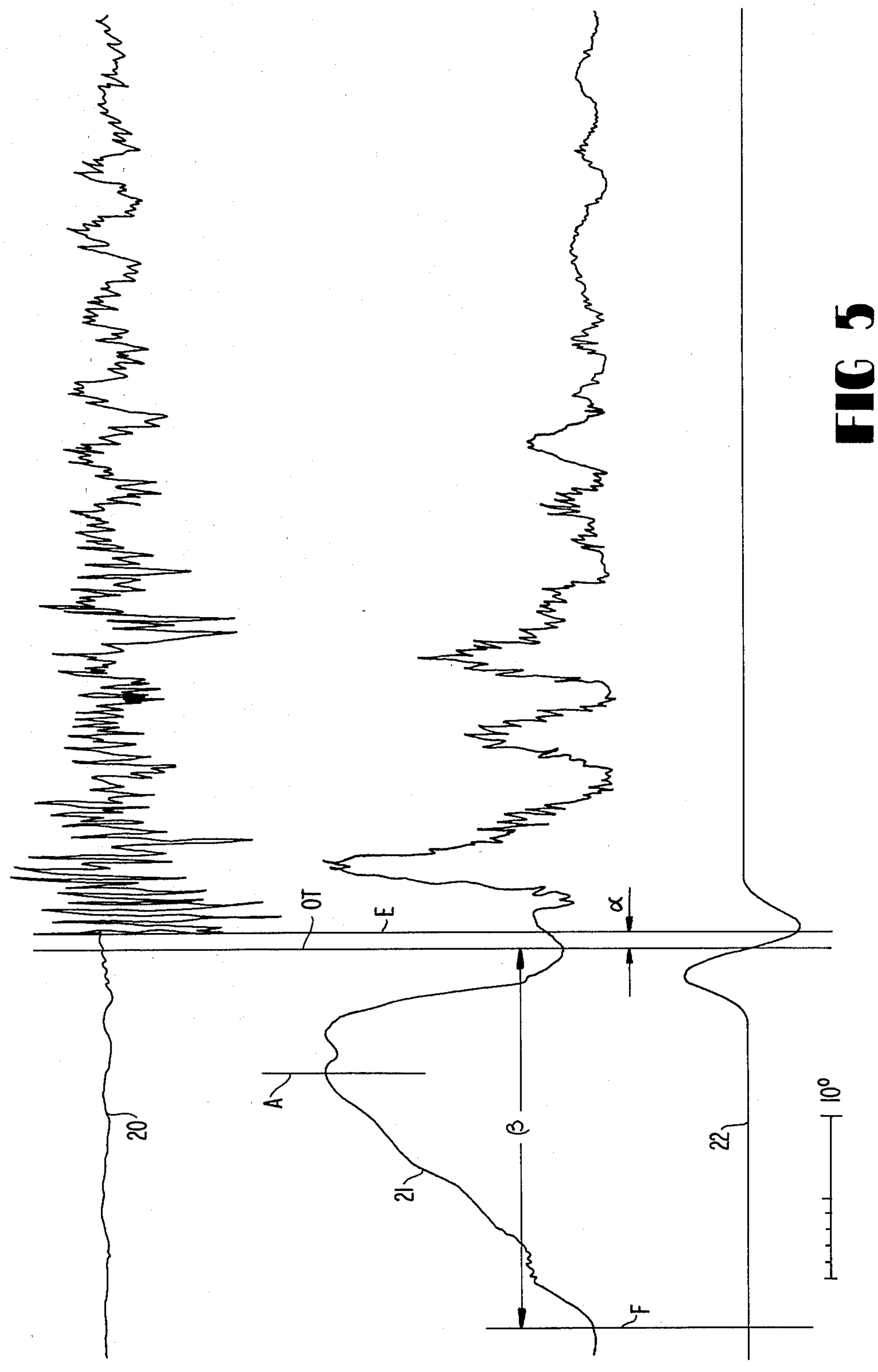
FIG. 5 is a similar oscillographic recording of the same engine with an injection adjusted too early.

In case of laboratory use, the method according to the present invention may also be realized in a different manner as will be explained by reference to the oscillograms (FIGS. 4 and 5). These oscillogram inscriptions contain three inscribed lines, and more particularly the body sound signal 20, the injection pressure 21 and the upper dead-center signal 22. It can be recognized from the inscribed recordings which were made at the engine itself with different pump adjustment and with a rotational speed differing by about 10%, that the angular space $\beta$ between the feed beginning F—corresponding to the beginning of the rise of the pressure curve 21—and the injection end E—start of the body sound signal—is identical in both cases notwithstanding the quite different phase position of the injection operation. This angular space $\beta$ is apparently determined essentially only by the constructive features of the pump. The injection beginning A, as to the rest, lies at the maximum point of the pressure curve. Consequently, the feed beginning can, in fact, be aligned as regards phase by reference to the injection end. The injection end E, in its turn, is marked by the sudden commencement of a strong high-frequency oscillation, which occurrence can be localized over very small angular spaces in contrast to the gradual beginning F of the pressure rise.

Figure 2:
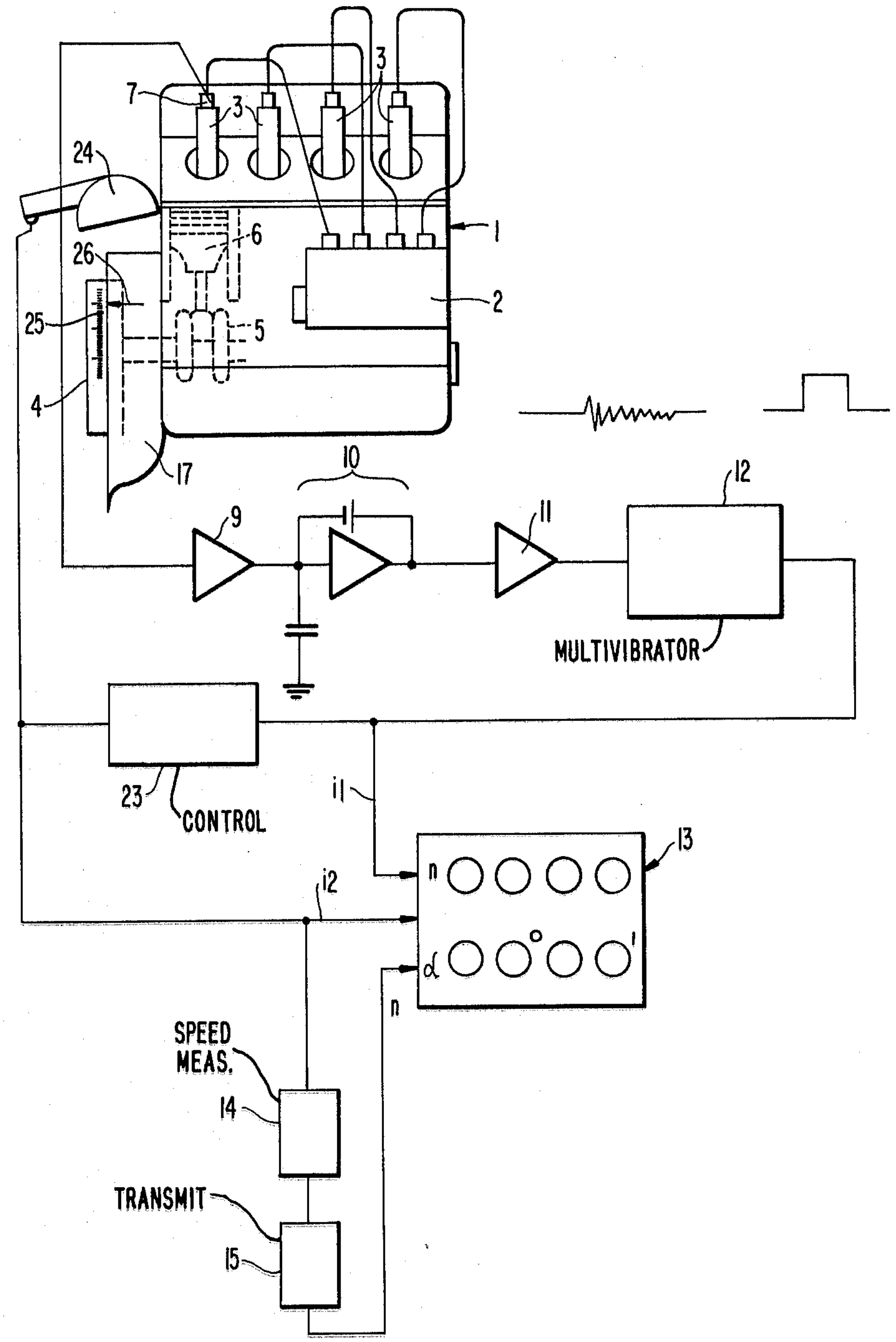
FIG. 2 is a schematic block diagram of a modified embodiment of a measuring installation for carrying out the method in accordance with the present invention, and more particularly with a stroboscopic dead-center indication.

The measuring system according to FIG. 2 differs from that according to FIG. 1 by the measuring means for the upper dead-center signal. This is stroboscopically produced in the measuring system according to FIG. 2. The control apparatus 23 for the stroboscopic light 24 is controlled by the rectangular pulse of the body sound signal produced in the output of the multivibrator 12. As a result thereof, the flashing frequency of the stroboscope is synchronized with the respective rotational speed of the Diesel engine 1. As customary, a gradation or division 25 is provided along the circumference of the flywheel 25 and a pointer marking 26 is provided on the flywheel housing 17 in a definite and readily visible position. An adjustable time delay for the flashes is built into the control apparatus 23 of the stroboscope, by means of which the phase position of the flashes can be adjusted relative to the control signal of the stroboscope. The time delay is appropriately so constituted that it provides a delay—corresponding to the synchronization frequency—by constant fractions of periods of time but not by constant time intervals. The stroboscopic flashes are so adjusted as regards phase that the scale line of the circumferential gradation or division 25 which corresponds to the angular position of the pointer 26, appears to coincide with the pointer. A flash is then always produced when passing through the upper dead-center position. This flash signal $i_2$ can be further processed like the upper dead-center signal in the measuring system according to FIG. 1.

The adjustment of the correct angle $\alpha$ between the upper dead-center position and the injection ending cannot only take place in such a manner that the prescribed angle between the upper dead-center position and the injection ending is approximated as accurately as possible by the measurement of the injection operations and the following adjustments (angular measuring method), but also in that it will be examined whether an auxiliary mark which is displaced by the prescribed angle $\alpha$ with respect to the position of the upper dead-center position, coincides in time with the body sound signal (zero or alignment method). With the stroboscopic method, for example, the stroboscope may be so adjusted as regards phase that the pointer mark 26 does not point on the scale line of the angular position (for example, 30°) of the pointer mark, but on 30° plus $\alpha$, for example, on 36°. The flash signals and the body sound signals must then arrive at the same time. The determination whether two signals are coincident in time or not can be determined under certain circumstances more simply from an apparatus point of view than the extent of a phase displacement. In the embodiment according to FIG. 1, the measuring pin 16 would then have to be displaced by the angle $\alpha$, for example, by 6°, with respect to the upper dead-center position or the angular position of the bracket 18.

Moreover, as pointed out above, conventional electronic means may also be utilized to analyze any periodic drift of the start of the closing noise about a normal position of time, which could be readily done by so analyzing the rising flank of the output pulse from the multivibrator 12. Moreover, the weaker closing noises produced by the other injection valves can be readily seen from an oscillogram of the type shown in FIGS. 4 and 5 and could also be analyzed by conventional electronic means to determine (count) the number thereof between any two strong noise signals and to analyze their regularity with respect to time, i.e., whether or not they occur each at predetermined regular intervals between two strong noise signals. Since electronic devices using conventional logic circuits are known in the art, which perform these functions, a detailed description thereof is dispensed with herein.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for determining the correct phase adjustment of periodic injection operations in cyclically operating internal combustion engines relative to a predetermined movement phase of drive unit parts of the internal combustion engine, comprising the steps of acoustically determining the closing of an injection valve of a working space of the engine while the internal combustion engine rotates, determining the time interval between the beginning of the noise representative of the closing of the injection valve with respect to the predetermined movement phase of the drive unit parts belonging to the working space, and utilizing the thus-determined time interval at least indirectly as control value.

2. A method accordng to claim 1, characterized by the following steps:
- (a) providing a marking adapted to be electrically detected at least indirectly at such a circumferential place of a part immovably connected with the drive unit parts that the marking represents the respective movement phases of the displacement element of the corresponding working space;
- (b) mounting a pick-up device operable to produce an electrical signal during the passage of said marking, on a circumferentially fixed part of the internal combustion engine at the circumferential place corresponding to the predetermined movement phase of the drive unit parts;
- (c) operatively connecting in an acoustically conductive manner a body sound pick-up element with the housing of the injection valve belonging to said working space for detecting the closing of the injection valve; and
- (d) feeding the electrical signals of the pick-up element and of the sound pick-up member at least indirectly into an electronic evaluating unit and determining therein the time interval therebetween.

3. A method according to claim 2, characterized by determining by means of the evaluating unit and on the basis of the sequence in time of the pick-up signals the rotational speed per minute of the internal combustion engine.

4. A method according to claim 3, characterized by indicating the rotational speed of the internal combustion engine in said evaluating unit.

5. A method according to claim 4, characterized by multiplying the determined time interval of the two signals with the determined rotational speed or a magnitude proportional thereto and indicating this product as value proportional to the angle.

6. A method according to claim 1, characterized by the following steps:
- (a) applying a circumferential gradation or marking with a definite and known circumferential position on a rotating part immovably connected with the drive unit parts and mounting a pointer at an adjacent location on a stationary part which points on the gradation or marking;
- (b) stroboscopically illuminating the circumferential gradation or marking with such a flash frequency and phase position of the flashes that the pointer appears to lie in coincidence with a scale line or with a marking representing the predetermined movement phase of the drive unit parts belonging to a working space;
- (c) operatively connecting in an acoustically conductive manner a body sound pick-up member with the housing body of the injection valve itself which belongs to the working space for detecting the closing of the injection valve; and
- (d) feeding the electrical signals of the body sound pick-up member and of the pulse sequence of the stroboscope at least indirectly to an electronic evaluating unit and determining therein the time interval therebetween.

7. A method according to claim 6, characterized by determining by means of the evaluating unit and on the basis of the stroboscopic pulses the rotational speed per minute of the internal combustion engine.

8. A method according to claim 7, characterized by indicating the rotational speed of the internal combustion engine in said evaluating unit.

9. A method according to claim 8, characterized by multiplying the determined time interval of the two signals with the determined rotational speed or a magnitude proportional thereto and indicating this product as value proportional to the angle.

10. A method according to claim 6, characterized by the step of filtering the electrical signal of the body sound pick-up member to remove low frequency background noise therefrom so as to provide a filtered signal reliably indicative of the closing of the injection valve.

11. A method according to claim 10, characterized by the step of generating a rectangular pulse with a steep rise in response to the filtered electrical signal of the body sound pick-up member so as to reliably indicate the closing of the injection valve and feedng the pulse signal to the electronic evaluating unit.

12. A method according to claim 6, characterized by the step of generating a rectangular pulse having a steep rise in response to the electrical signal of the body sound pick-up member so as to reliably indicate the closing of the injection valve and feeding the rectangular pulse to the electronic evaluating unit.

13. A method according to claim 6, characterized in that the stroboscope is triggered in response to the electrical signals of the body sound pick-up member.

14. A method according to claim 13, characterized by delaying by an adjustable time interval the triggering of the stroboscope in response to the electrical signals from the body sound pick-up member.

15. A method according to claim 14, characterized by delaying the triggering of the flash of the stroboscope by constant fractions of periods of time of the stroboscopic frequency.

16. A method according to claim 6, characterized by recording the output signal of the sound pick-up member in its progress with respect to time.

17. A method according to claim 6, characterized by evaluating the progress with respect to time of the output signal of the sound pick-up member.

18. A method according to claim 6, characterized in that the internal combustion engine is rotated at a rotational speed above the idling rotational speed during the measurements.

19. A method according to claim 18, characterized in that the internal combustion engine rotates at said rotational speed under its own force.

20. A method according to claim 6, characterized in that the internal combustion engine is accelerated from standstill.

21. A method according to claim 20, characterized in that the internal combustion engine is accelerated from standstill by an associated electric driving motor.

22. A method according to claim 1, characterized by recording the output signal of the sound pick-up member in its progress with respect to time.

23. A method according to claim 22, characterized in that the output signal is recorded over a large number of working cycles of the internal combustion engine.

24. A method according to claim 23, characterized by evaluating the progress with respect to time of the output signal of the sound pick-up member.

25. A method according to claim 24, characterized in that the internal combustion engine is rotated at a rotational speed above the idling rotational speed during the measurements.

26. A method according to claim 25, characterized in that the internal combustion engine rotates at said rotational speed under its own force.

27. A method according to claim 25, characterized in that the internal combustion engine is accelerated from standstill.

28. A method according to claim 27, characterized in that the internal combustion engine is accelerated from standstill by an associated electric driving motor.

29. A method according to claim 28, characterized in that the internal combustion engine rotates at said rotational speed under its own force.

30. A method according to claim 27, characterized by analyzing from the body sound signals a periodic drift of the beginning of the closing noise about a normal position with respect to time.

31. A method according to claim 30, characterized by detecting also the weaker closing noises of the injection valves which belong to the other working spaces of the internal combustion engines by means of the body sound pick-up member, and then evaluating the same.

32. A method according to claim 31, characterized in that the evaluation of the weaker noise signals takes place in a branched-off evaluating channel.

33. A method according to claim 31, characterized by counting the number of weaker closing noises recorded between two strong closing noises.

34. A method according to claim 33, characterized by recording the time intervals of the weaker closing noises.

35. A method according to claim 1, characterized by analyzing from the body sound signals a periodic drift of the beginning of the closing noise about a normal position with respect to time.

36. A method according to claim 1, characterized by detecting also the weaker closing noises of the injection valves which belong to the other working spaces of the internal combustion engines by means of the body sound pick-up member, and then evaluating the same.

37. A method according to claim 36, characterized in that the evaluation of the weaker noise signals takes place in a branched-off evaluating channel.

38. A method according to claim 36, characterized by counting the number of weaker closing noises recorded between two strong closing noises.

39. A method according to claim 36, characterized by recording the time intervals of the weaker closing noises.

40. A method according to claim 1, characterized by evaluating the progress with respect to time of the output signal of the sound pick-up member.

41. A method according to claim 1, characterized in that the internal combustion engine is rotated at a rotational speed above the idling rotational speed during the measurements.

42. A method according to claim 41, characterized in that the internal combustion engine rotates at said rotational speed under its own force.

43. A method according to claim 1, characterized in that the internal combustion engine is accelerated from standstill.

44. A method according to claim 43, characterized in that the internal combustion engine is accelerated from standstill by an associated electric driving motor.

45. A method according to claim 1, characterized in that the step of acoustically determining the closing of an injection valve of a working space includes operatively connecting in an acoustically conductive manner a body sound pick-up element with the housing of the injection valve belonging to said working space for detecting the closing of the injection valve and providing an output signal in accordance therewith, and filtering the electrical signal to remove low frequency background noises so as to provide a signal reliably indicative of the closing of the injection valve.

46. A method according to claim 45, characterized in that the step of acoustically determining the closing of the injection valve further includes generating a rectangular pulse having a steep rise in response to the beginning of the filtered body sound pick-up signal.

47. A method according to claim 1, characterized in that the step of acoustically determining the closing of an injection valve of a working space of the engine includes the steps of operatively connecting in an acoustically conductive manner a body sound pick-up element with the housing of the injection valve belonging to said working space for detecting the closing of the injection valve and providing an output signal in accordance therewith, and generating a rectangular pulse having a steep rise in response to the output signal of the body sound pick-up element for reliably indicating the closing of the injection valve.

48. An apparatus for determining the correct phase adjustment of the injection instants of internal combustion engines which include cylinder means with piston means reciprocating therein and defining at least in part a working space each, and an injection system including injection pump means and injection valve means for each working space, characterized by first means producing a first electric signal representing a predetermined position of one of said piston means in its reciprocatory movement, second means producing a second electric signal indicating the closing of the injection valve means associated with the working space of said one piston means by acoustically detecting the cosing noise thereof, and third means for determining the time interval between said respective first and second signal.

49. An apparatus according to claim 48, characterized in that the third means includes means for determining the rotational speed of the engine and means for multiplying the determined time interval by a factor proportional to the determined rotational speed.

50. An apparatus according to claim 49, characterized in that the third means includes display means for visually displaying at least some of the values determined thereby.

51. An apparatus according to claim 49, characterized in that the third means includes analyzing means for analyzing the progress with respect to time of the second signals.

52. An apparatus according to claim 49, characterized by means determining any drift of the start of successive second signals about a normal position.

53. An apparatus according to claim 49, characterized by detecting means acoustically detecting the weaker closing signals of other injection valve means and for analyzing the same with respect to at least one of number and correctness in recurrence.

54. An apparatus according to claim 48, wherein said second means includes a body sound pick-up member for acoustically detecting the closing noise of the closing of the injection valve means and producing an output in accordance therewith, filtering means for filtering low frequency background noise from the output signal of the body sound pick-up member so as to provide a filtered signal reliably indicating the closing of the injection valve means.

55. An apparatus according to claim 54, wherein said second means further includes generating means for generating a rectangular pulse having a steep rise in response to the filtered output of said filtering means, said rectangular pulse being said second electric signal indicating the closing of the injection valve means.

56. An apparatus according to claim 48, characterized in that the second means includes a body sound pick-up member for acoustically detecting the closing noise of the injection valve means and providing an output signal in accordance therewith, and means for generating a rectangular pulse having a steep rise in response to the output signal of said body sound pick-up member so as to reliably indicate the closing of the injection valve means, the rectangular pulse being said second electric signal.

57. An apparatus according to claim 48, characterized in that said first means includes a stroboscope for stroboscopically illuminating a circumferential gradation or marking on a rotating part immovably connected with drive unit parts with such a flash frequency and phase position of the flashes that a pointer mounted at an adjacent location on a stationary part which points on the gradation or marking appears to lie in coincidence with a scale line or with a marking representing the predetermined movement phase of the drive unit parts belonging to a working space, said first electrical signal being representative of the pulse sequence of the stroboscope.

58. An apparatus according to claim 57, wherein the stroboscope is triggered in response to said second electric signal from said second means.

59. An apparatus according to claim 58, characterized in that delay means are provided for delaying the stroboscopic flash by an adjustable time interval in response to the second electric signal from said second means.

60. An apparatus according to claim 59, characterized in that said delay means delays the flashes of the stroboscope by constant fractions of periods of time of the stroboscopic frequency.

* * * * *